US010320018B2

(12) United States Patent
Staudt et al.

(10) Patent No.: US 10,320,018 B2
(45) Date of Patent: Jun. 11, 2019

(54) DYNAMICALLY RESPONSIVE HIGH EFFICIENCY CCHP SYSTEM

(71) Applicant: Combined Energies LLC, Latham, NY (US)

(72) Inventors: Rhonda Lee Staudt, Niskayuna, NY (US); Donald Frank Rohr, Rexford, NY (US); John Anthony Vogel, Charlton, NY (US)

(73) Assignee: Combined Energies, LLC, Latham, NY (US)

( * ) Notice: Subject to any disclaimer, the term of this patent is extended or adjusted under 35 U.S.C. 154(b) by 649 days.

(21) Appl. No.: 14/142,873

(22) Filed: Dec. 29, 2013

(65) Prior Publication Data

US 2014/0272656 A1    Sep. 18, 2014

Related U.S. Application Data

(60) Provisional application No. 61/788,300, filed on Mar. 15, 2013, provisional application No. 61/788,532, (Continued)

(51) Int. Cl.
*H01M 8/04007* (2016.01)
*H01M 8/04* (2016.01)
(Continued)

(52) U.S. Cl.
CPC .......... *H01M 8/0675* (2013.01); *B01D 53/02* (2013.01); *B01D 53/0454* (2013.01);
(Continued)

(58) Field of Classification Search
None
See application file for complete search history.

(56) References Cited

U.S. PATENT DOCUMENTS

| 4,736,151 A | 4/1988 | Dishner |
| 4,860,185 A | 8/1989 | Brewer |

(Continued)

FOREIGN PATENT DOCUMENTS

| EP | 0 409 226 A2 | 1/1991 |
| EP | 0 409 226 A3 | 1/1991 |
| WO | 2016020192 A1 | 2/2016 |

OTHER PUBLICATIONS

Pham, Emily P., USPTO Non-Final Office Action related to U.S. Appl. No. 14/194,773, dated Dec. 4, 2015.
(Continued)

*Primary Examiner* — Yoshitoshi Takeuchi
(74) *Attorney, Agent, or Firm* — Justin W. McCabe; Dunkiel Saunders Elliott Raubvogel & Hand, PLLC (57) ABSTRACT

A highly efficient combined cooling, heating, and power (CCHP) system is capable of providing 100% utilization of an energy generator used by the system by distributing thermal and electrical outputs of the energy generator to loads and/or other storage apparatuses. The CCHP system includes an energy generator, which can be a fuel cell and a waste heat recovery unit that assists in recovering thermal energy from the energy generator and returning it to the energy generator, and/or providing it to a thermal load, or a storage as needed or desired.

16 Claims, 7 Drawing Sheets

Related U.S. Application Data filed on Mar. 15, 2013, provisional application No. 61/781,965, filed on Mar. 14, 2013, provisional application No. 61/784,894, filed on Mar. 14, 2013.

(51) Int. Cl.
  *H01M 8/0662* (2016.01)
  *B01D 53/04* (2006.01)
  *H01M 8/04089* (2016.01)
  *G05D 23/19* (2006.01)
  *G06Q 10/06* (2012.01)
  *B01D 53/02* (2006.01)
  *H01M 8/0612* (2016.01)
  *H01M 8/1018* (2016.01)

(52) U.S. Cl.
  CPC ... *G05D 23/1917* (2013.01); *G06Q 10/06315* (2013.01); *H01M 8/04007* (2013.01); *H01M 8/04097* (2013.01); *B01D 53/0462* (2013.01); *B01D 2253/108* (2013.01); *B01D 2257/302* (2013.01); *B01D 2257/304* (2013.01); *B01D 2257/306* (2013.01); *B01D 2257/308* (2013.01); *B01D 2259/40056* (2013.01); *B01D 2259/40098* (2013.01); *H01M 8/0618* (2013.01); *H01M 2008/1095* (2013.01)

(56) References Cited

U.S. PATENT DOCUMENTS

| | | |
|---|---|---|
| 5,946,206 A | 8/1999 | Shimizu |
| 6,243,277 B1 | 6/2001 | Sun |
| 6,311,279 B1 | 10/2001 | Nguyen |
| 6,370,050 B1 | 4/2002 | Peng |
| 6,375,924 B1 | 4/2002 | Towler et al. |
| 6,396,252 B1 | 5/2002 | Culpepper |
| 6,452,815 B1 | 9/2002 | Zhu et al. |
| 6,574,125 B2 | 6/2003 | Matsukawa |
| 6,882,063 B2 | 4/2005 | Droppo |
| 6,930,897 B2 | 8/2005 | Jungries |
| 6,944,033 B1 | 9/2005 | Xu |
| 7,072,194 B2 | 7/2006 | Nayar et al. |
| 7,161,331 B2 | 1/2007 | Wai |
| 7,295,448 B2 | 11/2007 | Zhu |
| 7,382,113 B2 | 6/2008 | Wai |
| 7,518,886 B1 | 4/2009 | Lai |
| 7,528,590 B2 | 5/2009 | Wei |
| 7,596,002 B2 | 9/2009 | Teichmann |
| 7,602,626 B2 | 10/2009 | Iwata et al. |
| 7,605,498 B2 | 10/2009 | Ledenev |
| 7,768,242 B2 | 8/2010 | Wei |
| 7,884,569 B2 | 2/2011 | Ward |
| 7,932,634 B2 | 4/2011 | Bourilkov |
| 7,978,483 B2 | 7/2011 | Mazzola |
| 8,072,785 B2 | 12/2011 | Nakahori |
| 8,098,055 B2 | 1/2012 | Avrutsky |
| 8,102,144 B2 | 1/2012 | Capp |
| 8,238,130 B2 | 8/2012 | Weigman |
| 8,259,478 B2 | 9/2012 | Devi |
| 8,278,887 B2 | 10/2012 | Williams |
| 8,343,673 B2 | 1/2013 | Yamashita |
| 8,791,597 B2 | 7/2014 | Chen |
| 2002/0082747 A1* | 6/2002 | Kramer ............... H02J 3/00 700/276 |
| 2002/0098394 A1 | 7/2002 | Keefer et al. |
| 2002/0106537 A1 | 8/2002 | Saito |
| 2002/0182462 A1* | 12/2002 | Ballantine ......... H01M 8/04007 429/431 |
| 2003/0201674 A1 | 10/2003 | Droppo |
| 2004/0037092 A1 | 2/2004 | Hasebe |
| 2004/0037100 A1 | 2/2004 | Orr et al. |
| 2006/0152085 A1 | 7/2006 | Flett et al. |
| 2006/0199051 A1 | 9/2006 | Bai et al. |
| 2008/0118800 A1 | 5/2008 | Devriendt et al. |
| 2008/0136374 A1 | 6/2008 | Nelson et al. |
| 2008/0152969 A1 | 6/2008 | Poonamallee et al. |
| 2008/0310200 A1 | 12/2008 | Maksimovic et al. |
| 2010/0142236 A1 | 6/2010 | Lee |
| 2010/0283242 A1 | 11/2010 | Dooley |
| 2010/0291445 A1 | 11/2010 | Igarashi |
| 2010/0316922 A1 | 12/2010 | Hamada |
| 2011/0075453 A1 | 3/2011 | Schugart |
| 2011/0176343 A1 | 7/2011 | Kojima |
| 2012/0091817 A1 | 4/2012 | Seymour et al. |
| 2012/0112547 A1 | 5/2012 | Ghosh |
| 2012/0163035 A1 | 6/2012 | Song et al. |
| 2012/0175962 A1 | 7/2012 | Zhan et al. |
| 2012/0212065 A1 | 8/2012 | Cheng |
| 2012/0276460 A1 | 11/2012 | Kumei et al. |
| 2012/0326516 A1 | 12/2012 | Gurunathan et al. |
| 2014/0268929 A1 | 9/2014 | Biebach et al. |
| 2014/0278699 A1 | 9/2014 | Schindler et al. |

OTHER PUBLICATIONS

Pham, "USPTO Notice of Allowance and Fee(s) Due", related to U.S. Appl. No. 14/194,773, dated Apr. 5, 2016.
Masinick, "Final Rejection", related to U.S. Appl. No. 14/083,787, dated Sep. 5, 2017.
Masinick, "USPTO Non-Final Office Action", related to U.S. Appl. No. 14/083,787 dated Feb. 14, 2017.
Pham, "First Office Action", related to U.S. Appl. No. 15/209,707, dated Jul. 14, 2017.
Thomas, "Final Rejection", related to U.S. Appl. No. 14/210,213, dated Aug. 28, 2017.
Thomas, "USPTO Non-Final Office Action", related to U.S. Appl. No. 14/210,213, dated Jan. 25, 2017.
Pham, "Notice of Allowance and Fee(s) Due", related to U.S. Appl. No. 15/209,707, dated, Oct. 26, 2017.
Grosse, "European Search Report and Written Opinion", dated Apr. 12, 2018.
Pham, "Non-Final Office Action", regarding U.S. Appl. No. 15/870,259, dated Jan. 25, 2019.

\* cited by examiner

DYNAMICALLY RESPONSIVE HIGH EFFICIENCY CCHP SYSTEM

RELATED APPLICATION DATA

This application claims the benefit of priority of U.S. Provisional Patent Application No. 61/788,532 filed Mar. 15, 2013, and titled Dynamically Responsive High Efficiency CCHP System, U.S. Provisional Patent Application No. 61/788,300 filed Mar. 15, 2013, and titled System and Method of Regenerating Desulfurization Beds in a Fuel Cell System, U.S. Provisional Patent Application No. 61/781,965 and filed Mar. 14, 2013, and titled Power Conversion System with a DC to DC Boost Converter, and U.S. Provisional Patent Application No. 61/784,894 filed Mar. 14, 2013, and titled Hybrid Autothermal Steam Reformer for Fuel Cell Systems, each of which is incorporated by reference herein in its entirety.

FIELD OF THE INVENTION

The present invention generally relates to the field of combined cooling, heating, and power systems. In particular, the present invention is directed to a dynamically responsive, high-efficiency, combined cooling, heating, and power system.

BACKGROUND

Combined cooling, heating, and power (CCHP) systems can take on several forms and have been known to include fuel cells. A fuel cell is an electrochemical device which reacts hydrogen with oxygen to produce electricity and water. The basic process is highly efficient, and fuel cells fueled directly by hydrogen are substantially pollution-free. Moreover, as fuel cells can be assembled into stacks of various sizes, fuel cell systems have been developed to produce a wide range of electrical power output levels and thus can be employed in numerous applications.

Although the fundamental electrochemical processes involved in fuel cells are well understood, engineering solutions have proven elusive for making efficient use of fuel cells, especially in residential and light commercial applications, where the power output demands of a fuel cell are not as significant as those in industrial and utility applications. The prior art approach of sophisticated balance-of-plant systems is unsuitable for optimizing and maintaining relatively low power capacity applications and often result in wasted energy and systems that are not cost-effective.

Improvements in fuel cell efficiency can be realized if there is recovery of the thermal energy produced by the fuel cell.

SUMMARY OF DISCLOSURE

In an exemplary aspect a combined cooling, heating, and power (CCHP) system is disclosed that comprises an energy generator that simultaneously produces electrical and thermal energy for a plurality of loads including at least a structure; a waste heat recovery system thermally coupled to the energy generator and including: a distribution system for delivering thermal energy to the structure; and a cooling system for providing conditioned air to the structure; wherein the waste heat recovery system is configured to recover thermal energy from the energy generator and to return a first portion of the recovered thermal energy to the energy generator and a second portion of the recovered energy to the distribution system or the cooling system depending on the present or future needs of the structure.

In another exemplary aspect a combined cooling, heating, and power (CCHP) system for use in a residential or light commercial structure having electric and thermal loads is disclosed. The CCHP system comprises a fuel cell system having thermal and electrical outputs; a waste heat recovery system including: a thermal management module; a storage system; a distribution system; and a cooling system; and a control system in communication with the fuel system and the waste heat recovery system, the control system configured to: receive a signal representative of a required electrical or thermal load; determine whether any additional loads are required by the structure after receiving the signal; and communicate with the fuel cell system and the waste heat recovery system so as maximize the utilization of the electrical and thermal outputs of the fuel cell system.

In yet another exemplary aspect, a method of efficiently using an energy generator capable of simultaneously producing electrical and thermal energy outputs is disclosed. The method comprises determining an electrical or thermal load need; determining which output of the energy generator satisfies the electrical or thermal load need; producing one of the simultaneously produced energy outputs to meet at least a portion of the electrical or thermal load need; directing the other of the simultaneously produced energy outputs to another load or to an energy storage system.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DESCRIPTION OF THE DISCLOSURE

A combined cooling, heating, and power (CCHP) system according to the present disclosure dynamically generates high-efficiency power, heating, and/or cooling on demand. The CCHP system of the present disclosure can be operated so as to produce high utilization of a fuel cell or group of fuel cells (often referred to as a "fuel cell stack"), using both the electric and thermal energy generated by the fuel cell for use within a structure throughout the year. In this way, the CCHP system provides near complete energy recovery. Operationally, a CCHP system according to one or more embodiments of the present disclosure allows for the use of readily available hydrocarbon fuels, such as natural gas, near atmospheric pressure operation, close-coupled heating and cooling systems, optimized power electronics, drop-in replacement for existing heating, cooling, and hot water systems, and grid integration.

Figure 1:
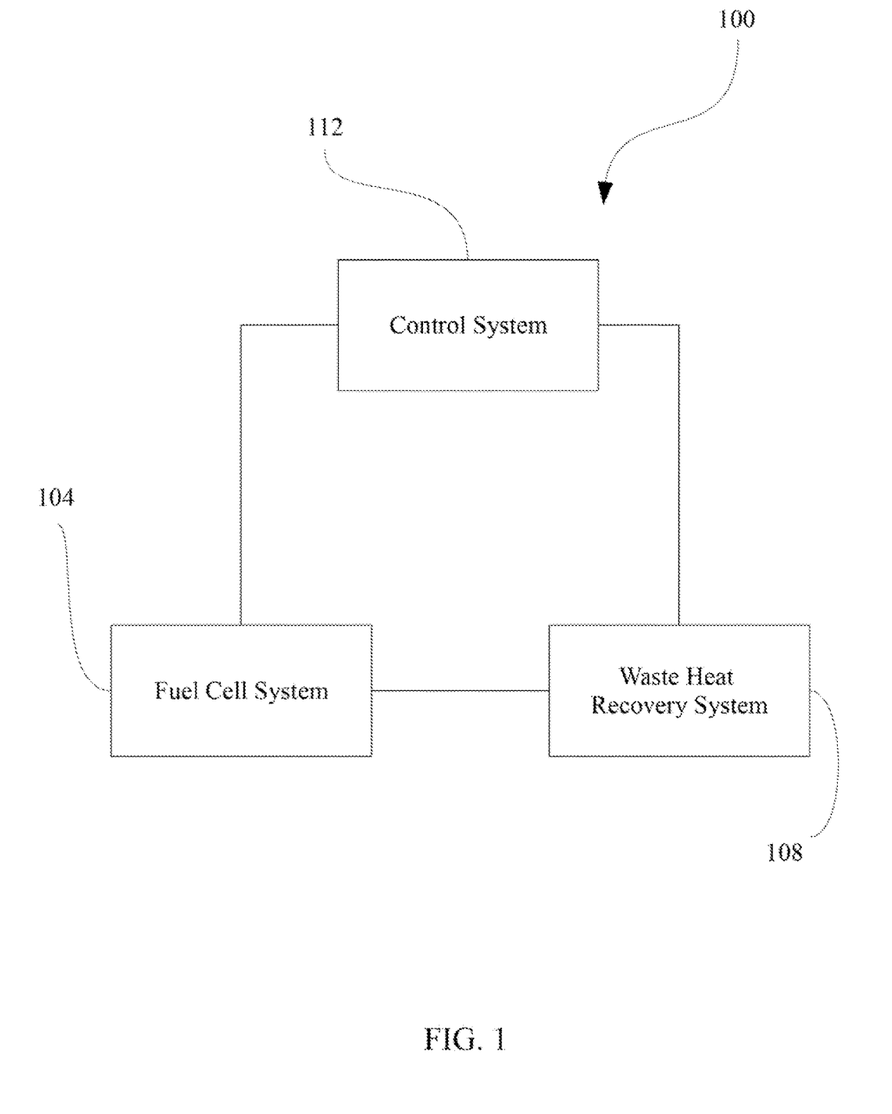
FIG. 1 is a block diagram of a combined cooling, heating, and power system according to an embodiment of the present invention.

FIG. 1 shows an exemplary CCHP system 100 according to an embodiment of the present invention. At a high level, CCHP system 100 includes a fuel cell system 104, a waste heat recovery system 108, and a control system 112. In operation, and as explained in more detail below, fuel cell system 104 uses a refined mixture of water, air, and hydrogen to produce electrical energy and thermal energy. As with most fuel cells, fuel cell system 104 must be kept within a predetermined temperature range in order to promote efficient operation of the cell. Thus, at least a portion of the thermal energy produced by fuel cell system 104 is removed by waste heat recovery system 108, which, as described more fully below, is designed and configured to make the fuel cell system's thermal energy available for both reuse within the fuel cell system as well as heating and cooling of the structure, e.g., residence, commercial building, etc., where CCHP system 100 resides.

Figure 2:
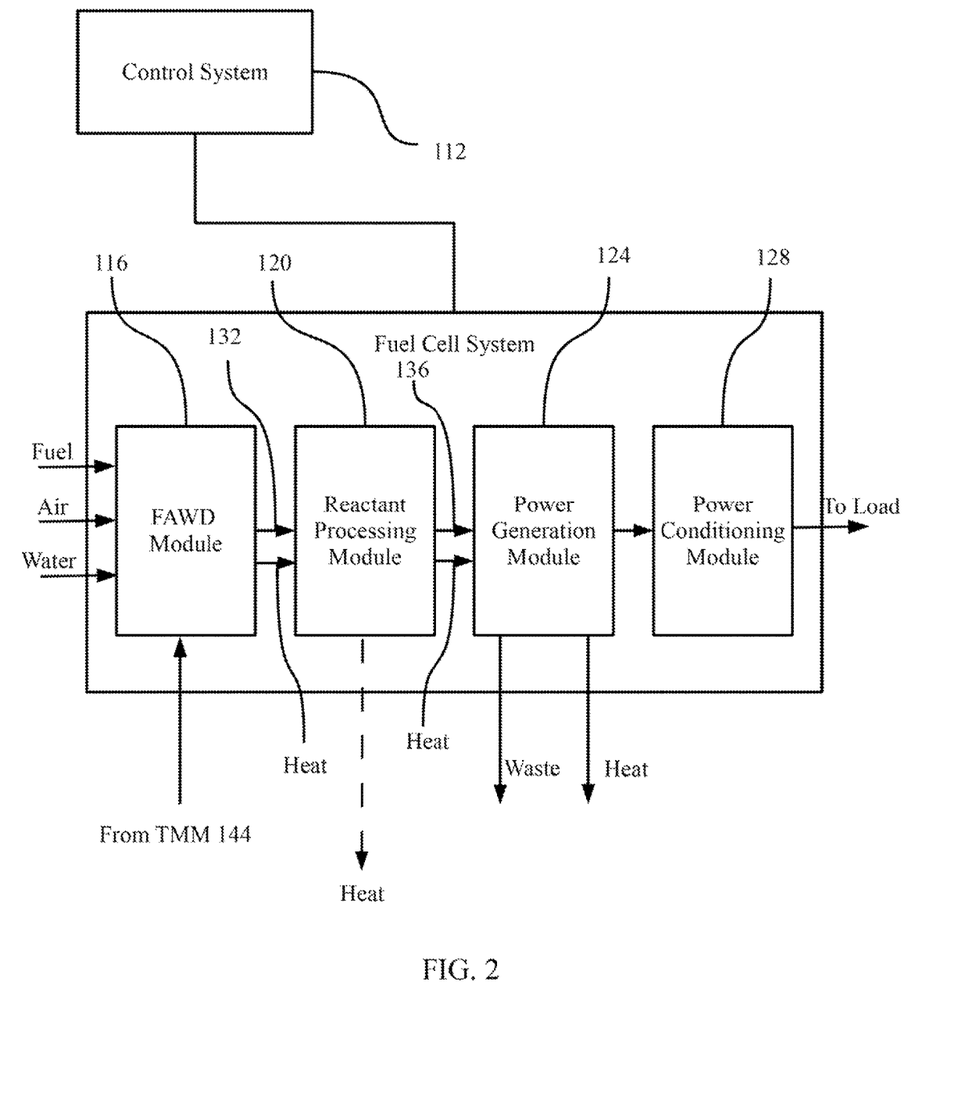
FIG. 2 is a block diagram of a fuel cell system according to an embodiment of the present invention.

FIG. 2 shows the primary components of an exemplary fuel cell system 104. As shown, fuel cell system 104 includes a fuel-air-water delivery (FAWD) module 116, a reactant processing module 120, a power generation module 124, and a power conditioning module 128.

At a high level, FAWD module 116 receives fuel, air, water, and heat as inputs, and produces a desulfurized, humidified fuel stream, i.e., a refined fuel stream 132, as an output. The fuel used in fuel cell system 104 generally varies by the type of fuel cell employed. For example, hydrogen, methanol, dilute light hydrocarbons like methane (by itself or in the form of natural gas) and propane are used by common fuel cell types. As discussed in more detail below, the type of fuel cell used effectively in fuel cell system 104 produces both electrical and thermal energy in sufficient amounts for use in the structure in which it is deployed. In an exemplary embodiment, a high temperature polymer electrolyte membrane (PEM) fuel cell is used in fuel cell system 104 and the input into FAWD module 116 is natural gas, which is generally readily commercially available, although other fuels could be used.

In an embodiment, FAWD module 116 can desulfurize the fuel (if necessary) by contacting the fuel with an adsorbent which preferentially adsorbs hydrogen sulfide, carbonyl sulfide, sulfur odorants, or combinations thereof at a selected temperature and pressure. In an alternative embodiment, FAWD module 116 can also include a hydrocarbon desulfurization bed, such as the hydrocarbon desulfurization bed described in Applicants' co-pending patent application entitled "System and Method of Regenerating Desulfurization Beds in a Fuel Cell System," U.S. Provisional Application Ser. No. 61/788,300, filed on Mar. 15, 2013, which is incorporated by reference for its discussion of the same.

FAWD module 116 may also further condition the fuel by altering the water content of the fuel to an appropriate level for the fuel cell system 104. The humidity of the refined fuel stream 132 may be increased by increasing the water input to the FAWD.

The input rate, temperature, pressure, and output of FAWD module 116 are regulated via control system 112, described in more detail below, so as to be responsive to the needs of the structure (e.g., thermal and electrical loads) and to optimize the utilization and efficiency of the CCHP system 100.

FAWD module 116 supplies refined fuel stream 132 to reactant processing module 120. Reactant processing module 120 provides the conditions necessary to deliver a reformate stream 136 to power generation module 124 that contains primarily $H_2$, $CO$, $CO_2$, $CH_4$, $N_2$ and $H_2O$. The two reactions, which generally take place within reactant processing module 120 and convert the refined fuel stream into hydrogen, are shown in equations (1) and (2).

½$O_2$+$CH_4$→2$H_2$+$CO$                    Equation (1)

$H_2O$+$CH_4$→3$H_2$+$CO$                    Equation (2)

The reaction shown in equation (1) is sometimes referred to as catalytic partial oxidation (CPO). The reaction shown in equation (2) is generally referred to as steam reforming. Both reactions may be conducted at a temperature of about 100° C. in the presence of a catalyst such as platinum. Reactant processing module 120 may use either of these reactions separately or in combination. While the CPO reaction is exothermic, the steam reforming reaction is endothermic. Reactors utilizing both reactions to maintain a relative heat balance are sometimes referred to as autothermal (ATR) reactors.

As evident from equations (1) and (2), both reactions produce carbon monoxide (CO). Such CO is generally present in amounts greater than 10,000 parts per million (ppm). In certain embodiments, because of the high temperature at which the power generation module 124 is operated, this CO acts as a fuel dilutant instead of a catalyst poison and generally does not affect the operation or long term health of the system.

Notably, the use of a high-temperature PEM fuel cell (as opposed to a low temperature PEM fuel cell system (e.g., less than 100° C. operating temperature) substantially avoids the problem of removing most of the CO from the reformate stream 136. Should additional CO removal be desired, however, reactant processing module 120 may employ additional reactions and processes to reduce the CO that is produced. For example, two additional reactions that may be used are shown in equations (3) and (4). The reaction shown in equation (3) is generally referred to as the shift reaction, and the reaction shown in equation (4) is generally referred to as preferential oxidation (PROX).

$CO$+$H_2O$→$H_2$+$CO_2$                    Equation (3)

$CO$+½$O_2$→$CO_2$                          Equation (4)

Various catalysts and operating conditions are known for accomplishing the shift reaction. For example, the reaction may be conducted at a temperature from about 300-600° C. in the presence of supported platinum. Other catalysts and operating conditions are also known. Such systems operating in this temperature range are typically referred to as high temperature shift (HTS) systems. The shift reaction may also be conducted at lower temperatures, such as 100-300° C., in the presence of other catalysts such as, but not limited to, copper supported on transition metal oxides. Such systems operating in this temperature range are typically referred to as low temperature shift (LTS) systems.

The PROX reaction may also be used to further reduce CO. The PROX reaction is generally conducted at lower temperatures than the shift reaction, such as between about 100-200° C. Like the CPO reaction, the PROX reaction can also be conducted in the presence of an oxidation catalyst such as platinum. The PROX reaction can typically achieve CO levels less than about 100 ppm (e.g., less than 50 ppm). Reactant processing module 124 can include additional or alternatives steps than those listed above to remove CO as is known in the art, and it is known that other processes to remove CO may be used.

In addition to converting the refined fuel stream 132 for use within power generation module 124 and removing undesirable components, reactant processing module 120 also removes heat from refined fuel stream 132. In an exemplary embodiment, heat removal is provided by a thermal fluid loop (not shown), which acts as a heat exchanger to remove heat from refined fuel stream 132 before the stream exits as reformate stream 136. Additional exemplary reactant processing modules are described in U.S. Pat. Nos. 6,207,122, 6,190,623, and 6,132,689, which are hereby incorporated by reference for their description of the same. In an exemplary embodiment, reactant processing module 120 includes a hybrid autothermal steam reformer of the type described in Applicants' co-pending patent application entitled "Hybrid Autothermal Steam Reformer for Fuel Cell Systems," U.S. Provisional Application Ser. No. 61/784,894, filed on Mar. 14, 2013, which is incorporated by reference for its disclosure of the same.

Reformate stream 136 is provided as an input to power generation module 124. Power generation module 124 is a device capable of producing electric power and concomitantly generating thermal energy. In an exemplary embodiment, power generation module 124, when operating, is capable of producing thermal energy at a temperature of between about 120° C. and about 190° C. In another exemplary embodiment, power generation module 124, when operating, is capable of producing thermal energy at about 1.5 kW of thermal energy per 1 kW of electrical energy. In another exemplary embodiment, power generation module 124 is a high temperature polymer electrolyte membrane (PEM) fuel cell (sometimes referred to as proton exchange membrane fuel cell), such as the PEM fuel cell 200 shown in FIG. 3.

Figure 3:
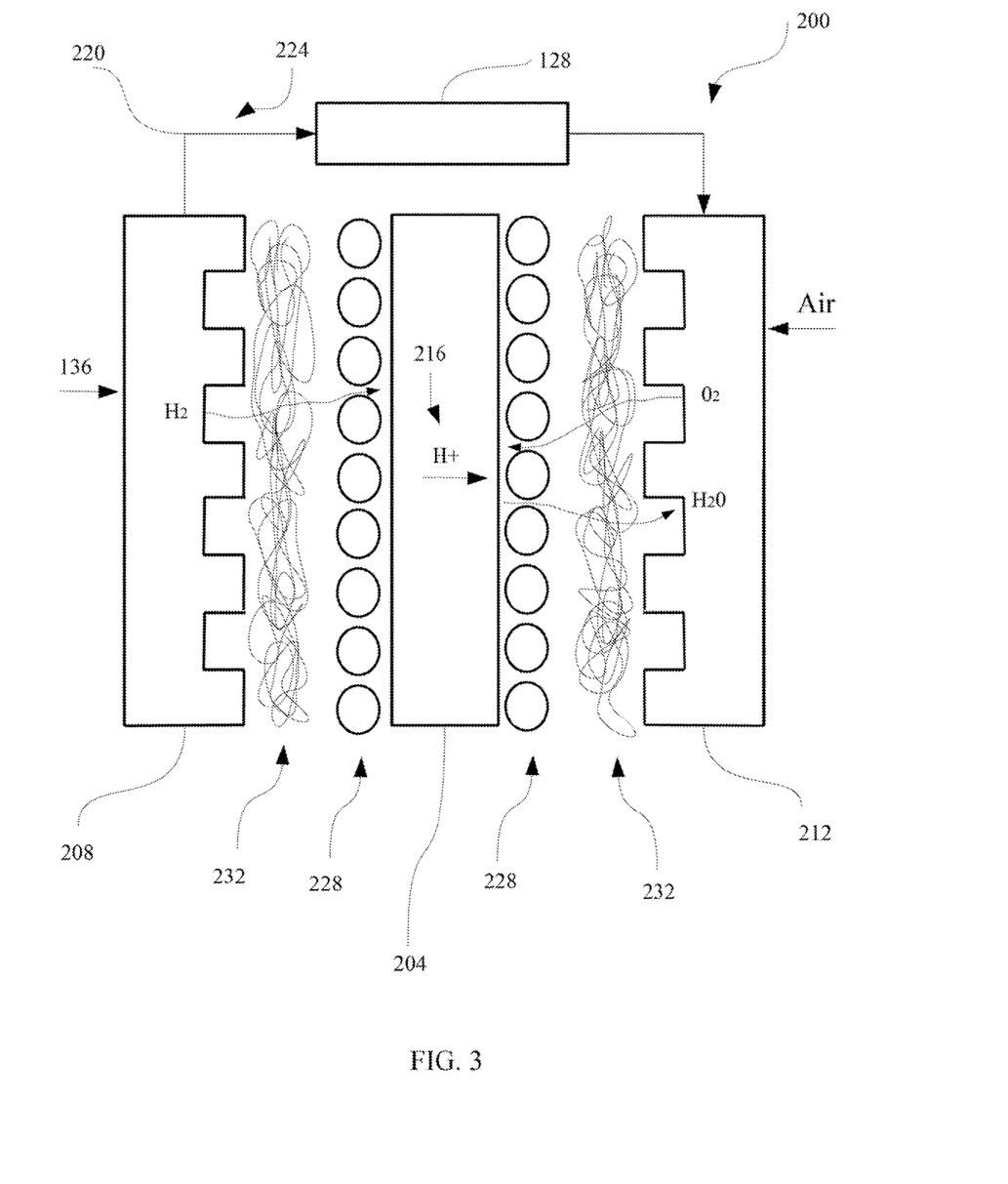
FIG. 3 is a schematic of a high temperature polymer electrolyte membrane fuel cell according to an embodiment of the present invention.

In PEM fuel cell 200, a membrane 204, such as, but not limited to, a phosphoric acid-doped cross-linked porous polybenzimidazole membrane, permits only protons 216 to pass between an anode 208 and a cathode 212. At anode 208, reformate stream 136 from reactant processing module 120 is reacted to produce protons 216 that pass through membrane 204. The electrons 220 produced by this reaction travel through circuitry 224 that is external to PEM fuel cell 200 to form an electrical current. At cathode 212, oxygen is reduced and reacts with protons 216 to form water. The anodic and cathodic reactions are described by the following equations (1) and (2), respectively:

$$H_2 \rightarrow 2H^+ + 2e^- \quad \text{Equation (1)}$$

$$O_2 + 4H^+ + 4e^- \rightarrow 2H_2O \quad \text{Equation (2)}$$

A typical single fuel cell has a terminal voltage of up to approximately one volt DC. For purposes of producing much larger voltages, several fuel cells may be assembled together to form an arrangement called a fuel cell stack—an arrangement in which the fuel cells are electrically coupled together in series to form a larger DC voltage (a voltage near 100 volts DC, for example) and thus to provide more power and more thermal energy. An exemplary description of a fuel cell stack is found in U.S. patent application Ser. No. 6,534,210, titled "Auxiliary Convective Fuel Cell Stacks for Fuel Cell Power Generation Systems", which is incorporated by reference for its discussion of the same. Typically, the fuel cell stack may include flow plates (graphite, composite, or metal plates, as examples) that are stacked one on top of the other. The flow plates may include various surface flow channels and orifices to, as examples, route the reactants and products through the fuel cell stack. In the instance of use of a fuel cell stack, several membranes 204 (each one being associated with a particular fuel cell) may be dispersed throughout the fuel cell stack between anodes 208 and cathodes 212 of different fuel cells. Electrically conductive gas diffusion layers (GDLs) 232 may be located on each side of each membrane 204 to act as a gas diffusion medium and in some cases to provide a support for fuel cell catalysts 228. In this manner, reactant gases from each side of the membrane 204 may pass along the flow channels and diffuse through the GDLs 232 to reach the membrane 204.

Returning to FIG. 2, power conditioning module 128 receives variable DC electrical energy produced by power generation module 124 and outputs conditioned DC or AC power, depending on the desired application of the output power. In an embodiment, power conditioning module 128 converts variable, low-voltage DC power from the power generation module 124 using a highly efficient, high boost ratio (e.g., >5:1), variable low voltage input, bi-directional DC-DC converter connected to a highly efficient bidirectional inverter connected to the electrical grid. An example of a highly efficient, high boost ratio, bi-directional DC-DC converter is found in Applicants' co-pending application entitled, "Power Conversion System with a DC to DC Boost Converter", U.S. Provisional Application Ser. No. 61/781, 965, filed on Mar. 14, 2013, which is incorporated by reference for its discussion of the same. Power conditioning module 128 may also be designed and configured to provide conditioned power to the structure, for example, for residential uses. In another embodiment, power conditioning module 128 conditions power for both local loads, e.g., battery-powered cars, battery strings, other residential or light commercial loads, and for the electric grid. In this embodiment, if local loads are not high enough to use all of the power produced by the power generation module 124, the excess electrical power is conditioned for input to the electric grid.

Figure 4:
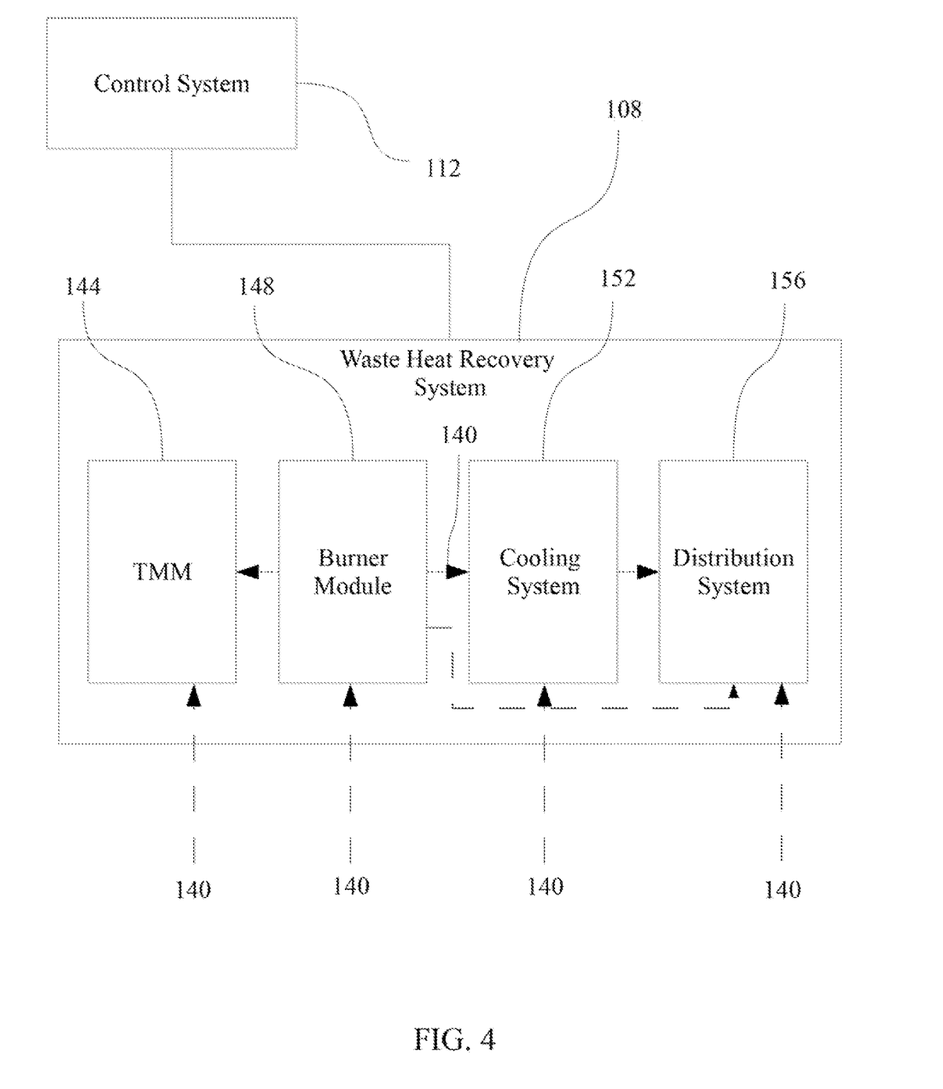
FIG. 4 is a block diagram of a waste heat recovery system according to an embodiment of the present invention.

As discussed previously, CCHP system 100 includes a waste heat recovery system 108, an exemplary embodiment of which is shown in FIG. 4. Waste heat recovery system 108 includes a thermal management module 144, a burner module 148, a cooling system 152, and a distribution system 156.

Thermal management module (TMM) 144 assists in controlling the operating temperatures of FAWD 108, reactant processing module 120, and power generation module 124, and directs thermal energy, as needed by the structure, to cooling system 152, and distribution system 156. TMM 144 manages the heat distribution throughout CCHP system 100 primarily via a heat transfer loop 140. Heat transfer loop 140 includes valves and pumps (not shown) that are controlled by control system 112 so as to provide the proper rate of fluid flow in the heat transfer loop. Metrics that are considered in determining the rate of fluid flow include, but are not limited to, a pump speed, a fuel cell stack inlet temperature, a fuel cell stack outlet temperature, a valve setting, and a return temperature from heat transfer loop 140, so as to provide efficient heat generation and distribution.

In an exemplary embodiment, the rate of fluid flow is determined by receiving a command for heating or cooling to a load in need thereof and providing stored heat or cooling to the load. If stored capacity is unable to satisfy the load demand from storage, burner module 148 (discussed further below) provides heat to heat transfer loop 140. Heat transfer loop 140 is used to heat the power generation module, reactant processing module 120, and heating and/or cooling system. In this embodiment, control system 112 can receive signals indicative of, for example, temperature inside the structure, the temperature outside the structure, and can use algorithms based on these signals to determine whether to start the fuel cell and export power. If the fuel cell needs to be operated, fuel flows to FAWD module 116 and reactant processing module 120. Once reformate stream 132 is of sufficient quality, it is delivered to the fuel cell, which begins to generate power and send heat to heat transfer loop 140. Control system 112 monitors temperature in heat transfer loop 140 and if necessary for heating or cooling, turning burner module 148 down or off as appropriate. In an exemplary embodiment, peak heating or cooling demands are by controlling burner module 148 rather than oversizing the rest of CCHP system 100.

Burner module 148 generates on-demand heat for use in the structure, provides auxiliary heat for subsystems during the startup of reactant processing module 120 and power generation module 124, provides auxiliary heat for special operations, provides peak heat for application heating and cooling loads, and assists in completing the combustion of unburned hydrocarbons, volatile organic compounds or carbon monoxide in the exhaust stream coming from FAWD module 116 as well as the reactant processing and power generation modules. Burner module 148 is monitored for burn temperatures to ensure substantially complete combustion of exhaust gases.

Cooling system 152 is used to deliver conditioned air to the structure. In an exemplary embodiment, cooling system 152 includes a reactor 160 and an evaporator 164. Reactor 160 contains an active substance, such as salt, and evaporator 164 contains a volatile, absorbable liquid, such as water. At a high level, the operation of this exemplary cooling system 152 is as follows: (1) heat from TMM 144 is delivered to reactor and hence absorbed water is expelled from the reactor to the condenser, (2) when cooling is desired, a vacuum is applied to the evaporator 164, the water begins to rapidly be removed from the evaporator, and the remaining water gets colder. By coupling a coiled tube proximate to the evaporator, a liquid can be cooled and subsequently used for cooling within the structure.

Distribution system 156 manages the heat provided by TMM 144 to the application (e.g., residence, light industrial). In an exemplary embodiment, distribution system 156 includes appropriate fan/pump and connected ducting/piping to provide heat to the structure.

Control system 112 is designed and configured to manage the components of CCHP system 100 by collecting information from inputs that are internal and external to the system. Those inputs that are internal to the system include, but are not limited to, a reactant processing temperature, a FAWD blower/pump speed, a TMM temperature, a TMM pump speed, a stack inlet temp, a stack outlet temp, a valve setting, a stack voltage, a stack DC power output, an inverter power output, an air mass flow rate, and a fuel mass flow rate. Those inputs that are external to the system include, but are not limited to, a heat demand, a cooling demand (e.g., thermostat information), a hot water demand, and a load demand. Information collected by control system 112 is input into programmed algorithms, set points, or lookup tables so as to determine operating parameters for CCHP system 100 components, control signals, and/or to generate external data for use in evaluating the efficiency, lifespan, or diagnosing problems with the CCHP system. Although control system 112 is presently described as a separate component of CCHP system 100, it is understood that control system 112 can be dispersed among the various components described herein without affecting the function of the CCHP system.

In general, for fuel cell system 104, power generation is increased by raising fuel and air flow to the fuel cell in proportion to the stoichiometric ratios dictated by the equations listed above. Thus, control system 112 may monitor, among other things, the output power of power generation module 124 and/or the thermal energy output, and based on the monitored output power and voltage of the fuel cell, estimate the fuel and air flows required to satisfy the power demand by the thermal or electrical load of the structure. The ratio of fuel or air provided to a fuel cell over what is theoretically required by a given power demand is sometimes referred to as "stoich". For example, 1 anode stoich refers to 100% of the hydrogen theoretically required to meet a given power demand, whereas 1.2 stoich refers to 20% excess hydrogen over what is theoretically required.

As briefly discussed above, CCHP system 100 may provide power to a load, such as a load that is formed from residential appliances and electrical devices that may be selectively turned on and off to vary the power that is demanded. Thus, in some applications the electric load required of CCHP system 100 may not be constant, but rather the power that is consumed by the load may vary over time and/or change abruptly. Moreover, thermal loads required by the structure, such as heating requirements in the fall and winter months or cooling requirements in the summer, with or without electric load demands, may place different demands on the CCHP system 100. The availability of power and thermal capacity from CCHP system 100 is controlled by control system 112.

Figure 5:
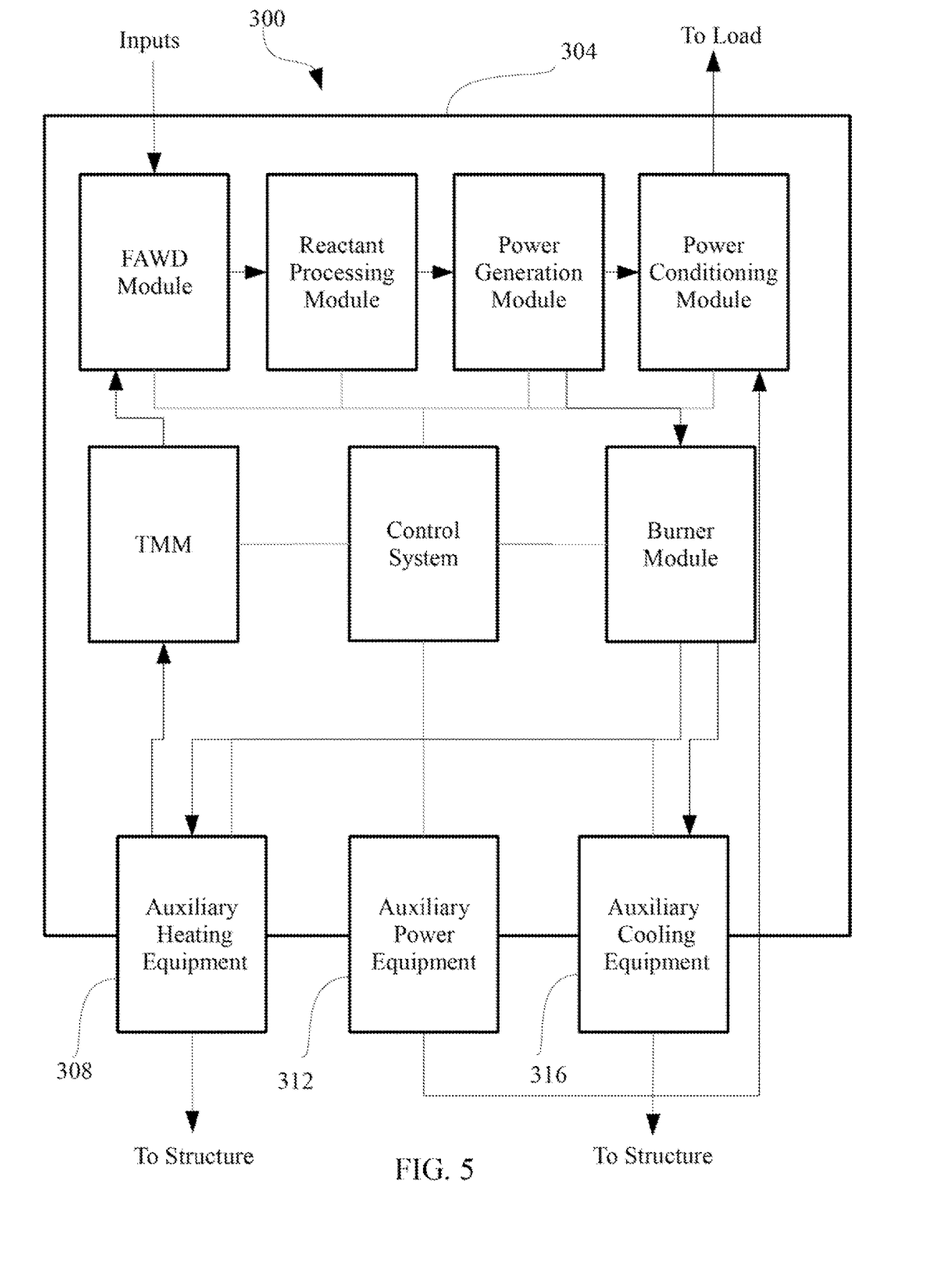
FIG. 5 is a block diagram of a combined cooling, heating, and power system according to another embodiment of the present invention.

Another embodiment of a CCHP system according to the present disclosure is shown in FIG. 5. In this embodiment, CCHP 300 includes the primary components of CCHP 100 (not labeled for clarity) in a single structure or enclosure 304, which can be sized and configured to drop in as a replacement for a traditional heating, cooling, and water heating unit. Auxiliary components, such as auxiliary heating equipment 308, auxiliary power equipment 312, and auxiliary cooling equipment 316, while including items such as duct work for distributing heated air throughout a structure, are each also typically designed and configured such that the CCHP 300 is not "over-designed". For example, CCHP 300 may be designed to heat the structure in which it resides on all but the 3% of coldest days and to rely on the auxiliary heating equipment 308 to provide the additional heat on those days. In this way, CCHP 300 is not overdesigned by being sized to handle all possible heating loads. Similarly, CCHP 300 need not be designed to meet all possible cooling or power loads, as auxiliary cooling equipment 316 and auxiliary power equipment 312 can assist during peak demand times.

Among the advantages of one or more of the exemplary CCHP systems as described herein are:

1. The CCHP system can allow for high utilization (approaching, and at times including, 100%) of the fuel cell, allowing for substantial use of the electric and thermal power during varying electric and thermal load conditions. In an exemplary embodiment, the CCHP system can allow utilization of the fuel cell approaching 100%.

2. Substantial energy recovery is achieved by storing thermal energy produced by the fuel cell system.

3. The CCHP system is capable of using readily available hydrocarbon fuels such as natural gas and propane instead of expensive, difficult-to-obtain fuels such as hydrogen or methanol. Moreover, the use of high-temperature PEM fuel cells, as proposed herein, lessens the need for expensive steam or low efficiency, low temperature shift reformers.

4. The CCHP system can operate near atmospheric pressure, thereby increasing the system efficiency of the appliance by reducing parasitic losses from compressors and blowers (sometimes used to increase power density by pressurizing feed streams to manage liquid water in the system). For example, the CCHP system is about 20% more efficient than similar systems that use compressors. The CCHP system does not require liquid water management, and power density is traded off for system efficiency.

5. The CCHP system uses close-coupled heating and cooling systems, which share plumbing and heat transfer media, thereby creating a simple, integrated appliance.

6. The CCHP system can include optimized power electronics, such as power conditioning system 120, which assists in maximizing power generation, extending fuel cell stack life, and providing high system efficiency.

7. The CCHP system is designed and configured as a drop-in replacement for existing heating, cooling, and hot water systems, thereby reducing the expense of using the CCHP system as a replacement. Moreover, by using the grid to supplement the CCHP system during peak load, the most expensive component in the system, the fuel cell system can be right-sized for maximum utilization, rather than sizing the fuel cell system for peak load power usage (ensuring an over-capacity component that is challenged to return its capital cost) or under-sizing the fuel cell system such that it runs beneath the power usage profile of the application.

Figure 6:
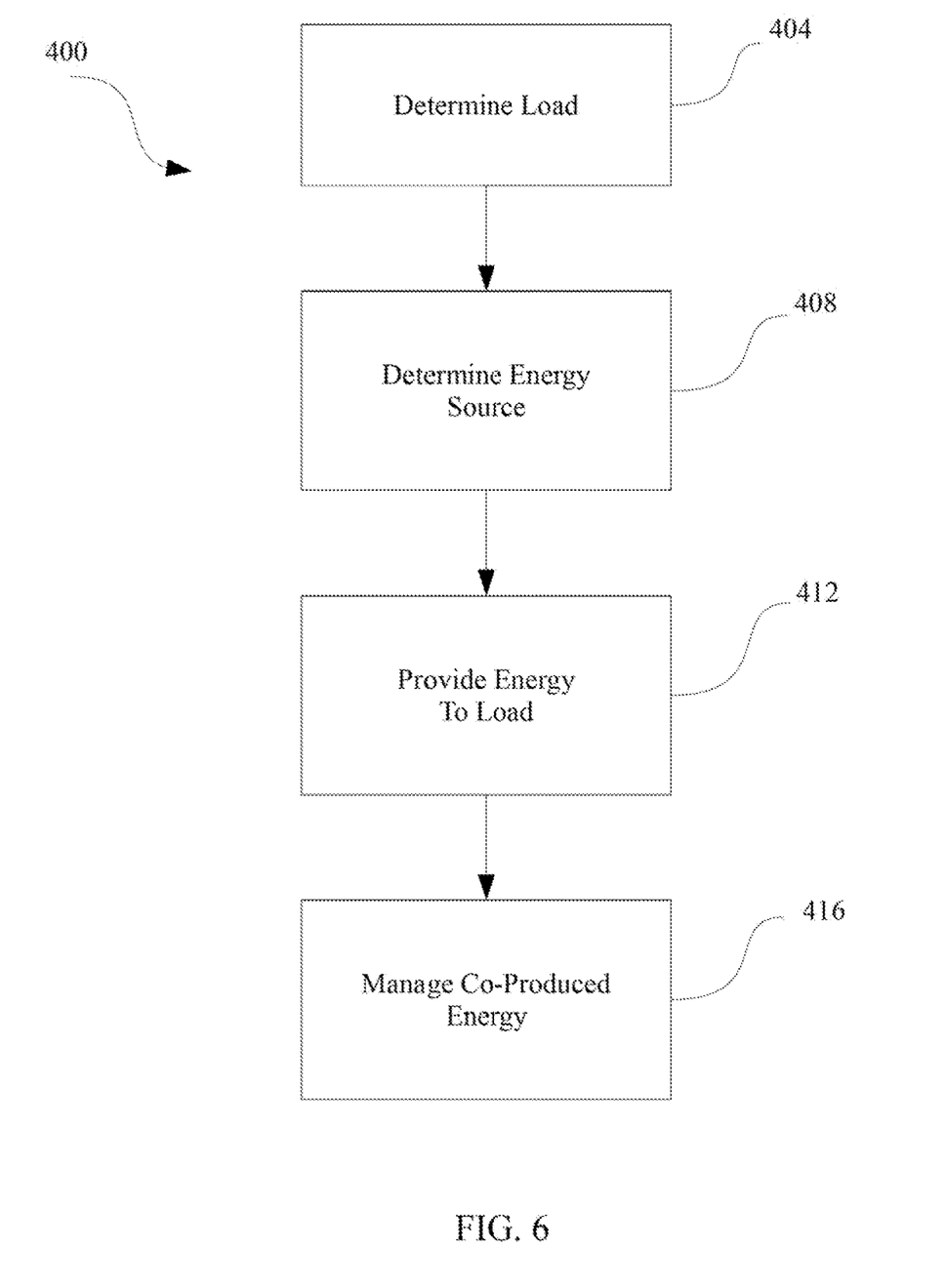
FIG. 6 is a block diagram of a method of creating, delivering, and storing co-produced energy according to an embodiment of the present invention.

Turning now to an exemplary operation of CCHP system 100 and with reference to exemplary embodiments shown in FIGS. 1-4 and in addition with reference to FIG. 6, there is shown a process 400.

At step 404, there is a determination of the load of the structure or outside load or both. In this embodiment, "load" may mean power needs, heating needs, or cooling needs, or any combination of the same. The load may be determined by a control system, such as control system 112, which monitors activity in the structure such as, but not limited to, activation of machinery or appliances, changes in temperature within the structure or external to the structure, or via preprogrammed routines, or any combination of the aforementioned. Control system 112 may also receive external information, such as that the power rebates from the provision of power to the utility grid are beneficial to generate power for delivery to the grid.

At step 408, there is a determination as to which energy sources would be necessary to meet the load demands of the structure/outside load. In certain embodiments, there may be multiple simultaneous load demands of different types.

At step 412, energy is provided to meet the load demand. For example, power may be produced by a CCHP, such as CCHP system 100, in order to meet electrical load demands of the structure.

At step 416, the co-produced energy, i.e., heat or cooling if electrical power is needed or electrical power if heat or cooling is need, is delivered and stored. For example, if the structure is demanding electrical load, but no other load is required, the CCHP system may store the heat generated by operating the fuel cell system in the cooler system for later use. Alternatively, heat may be stored in a water tank or other heat sink for later use. If heat is needed, the electrical energy produced by the fuel cell may be delivered to the electrical grid.

Figure 7:
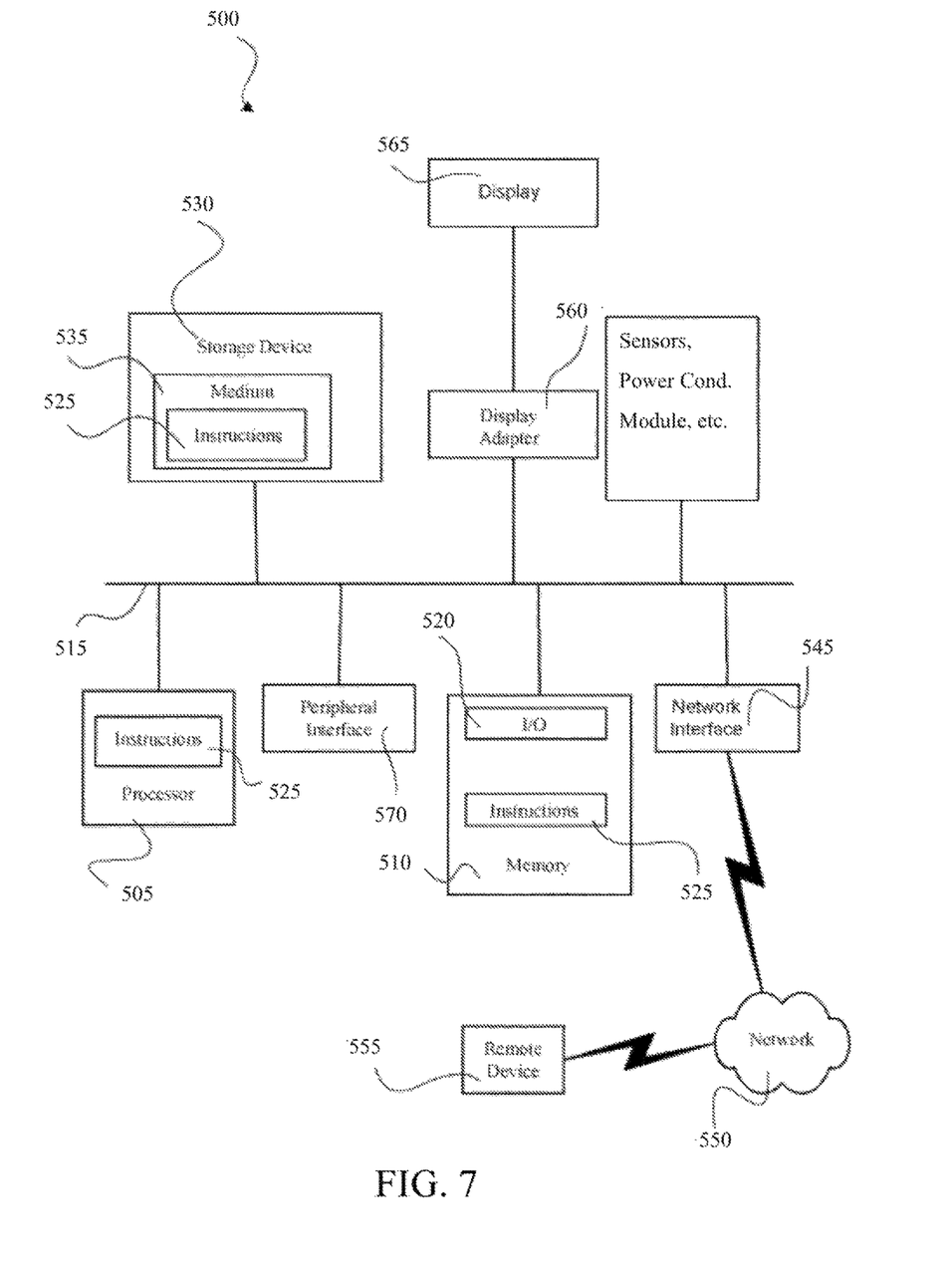
FIG. 7 is a block diagram of a computing environment that may be used to implement a combined cooling, heating, and power system according to an embodiment of the present invention.

FIG. 7 shows a diagrammatic representation of one implementation of a machine/computing device 500 that can be used to implement a set of instructions for causing one or more control systems of CCHP system 100, for example, device 500, to perform any one or more of the aspects and/or methodologies of the present disclosure. Device 500 includes a processor 505 and a memory 510 that communicate with each other, and with other components, such as control system 112, fuel cell system 104, or waste heat recovery system 108, via a bus 515. Bus 515 may include any of several types of communication structures including, but not limited to, a memory bus, a memory controller, a peripheral bus, a local bus, and any combinations thereof, using any of a variety of architectures.

Memory 510 may include various components (e.g., non-transitory machine-readable media) including, but not limited to, a random access memory component (e.g, a static RAM "SRAM", a dynamic RAM "DRAM", etc.), a read-only component, and any combinations thereof. In one example, a basic input/output system 520 (BIOS), including basic routines that help to transfer information between elements within device 500, such as during start-up, may be stored in memory 510. Memory 510 may also include (e.g., stored on one or more non-transitory machine-readable media) instructions (e.g., software) 525 embodying any one or more of the aspects and/or methodologies of the present disclosure. In another example, memory 510 may further include any number of program modules including, but not limited to, an operating system, one or more application programs, other program modules, program data, and any combinations thereof.

Device 500 may also include a storage device 530. Examples of a storage device (e.g., storage device 530) include, but are not limited to, a hard disk drive for reading from and/or writing to a hard disk, a magnetic disk drive for reading from and/or writing to a removable magnetic disk, an optical disk drive for reading from and/or writing to an optical media (e.g., a CD, a DVD, etc.), a solid-state memory device, and any combinations thereof. Storage device 530 may be connected to bus 515 by an appropriate interface (not shown). Example interfaces include, but are not limited to, SCSI, advanced technology attachment (ATA), serial ATA, universal serial bus (USB), IEEE 1395 (FIREWIRE), and any combinations thereof. In one example, storage device 530 may be removably interfaced with device 500 (e.g., via an external port connector (not shown)). Particularly, storage device 530 and an associated machine-readable medium 535 may provide nonvolatile and/or volatile storage of machine-readable instructions, data structures, program modules, and/or other data for device 500. In one example, instructions 525 may reside, completely or partially, within machine-readable medium 535. In another example, instructions 525 may reside, completely or partially, within processor 505.

Device 500 may also include a connection to one or more systems or modules included with CCHP system 100. Any system or device may be interfaced to bus 515 via any of a variety of interfaces (not shown) including, but not limited to, a serial interface, a parallel interface, a game port, a USB interface, a FIREWIRE interface, a direct connection to bus 515, and any combinations thereof. Alternatively, in one example, a user of device 500 may enter commands and/or other information into device 500 via an input device (not shown). Examples of an input device include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), touchscreen, and any combinations thereof.

A user may also input commands and/or other information to device 500 via storage device 530 (e.g., a removable disk drive, a flash drive, etc.) and/or a network interface device 545. A network interface device, such as network interface device 545, may be utilized for connecting device 500 to one or more of a variety of networks, such as network 550, and one or more remote devices 555 connected thereto. Examples of a network interface device include, but are not limited to, a network interface card, a modem, and any combination thereof. Examples of a network include, but are not limited to, a wide area network (e.g., the Internet, an enterprise network), a local area network (e.g., a network associated with an office, a building, a campus, or other relatively small geographic space), a telephone network, a direct connection between two computing devices, and any combinations thereof. A network, such as network 550, may employ a wired and/or a wireless mode of communication. In general, any network topology may be used. Information (e.g., data, instructions 525, etc.) may be communicated to and/or from device 500 via network interface device 555.

Device 500 may further include a video display adapter 560 for communicating a displayable image to a display device 565. Examples of a display device 565 include, but are not limited to, a liquid crystal display (LCD), a cathode ray tube (CRT), a plasma display, and any combinations thereof.

In addition to display device 565, device 500 may include a connection to one or more other peripheral output devices including, but not limited to, an audio speaker, a printer, and any combinations thereof. Peripheral output devices may be connected to bus 515 via a peripheral interface 570. Examples of a peripheral interface include, but are not limited to, a serial port, a USB connection, a FIREWIRE connection, a parallel connection, a wireless connection, and any combinations thereof.

A digitizer (not shown) and an accompanying pen/stylus, if needed, may be included in order to digitally capture freehand input. A pen digitizer may be separately configured or coextensive with a display area of display device 565. Accordingly, a digitizer may be integrated with display device 565, or may exist as a separate device overlaying or otherwise appended to display device 565.

According to an embodiment of the present disclosure, there is described a combined cooling, heating, and power (CCHP) system for a structure comprising an electric power generator that simultaneously produces electrical and thermal energy; a waste heat recovery system designed and configured to cool ambient air and to receive the thermal energy from the electric power generator, the waste heat recovery system having at least two modes of operation; wherein in a first mode of operation the waste heat recovery system stores the thermal energy from the electric power generator, and wherein in a second mode of operation the waste heat recovery system uses the stored thermal energy to cool ambient air; and a control system designed and configured to control the electric power generator and the waste heat recovery system such that the electric power generator supplies electricity to the structure and/or thermal energy to the waste heat recovery system. Further, wherein the electric power generator is a fuel cell. Further, wherein the electric power generator is a fuel cell having an operating temperature between about 120° C. and 190° C. Further, wherein the electric power generator is a high temperature PEM fuel cell. Also, wherein the electric power generator is connected to a load and an electrical grid. Further, wherein the control system diverts electric power to the electrical grid if the electric power generator produces more electrical energy than is required by the load.

According to another embodiment of the present disclosure, there is described a combined cooling, heating, and power (CCHP) system for a structure having thermal and electrical loads, the CCHP system comprising: a housing; an electric power generator disposed within the housing; a power conversion module electrically coupled to the electric power generator and the structure, the power conversion module being disposed within the housing; a waste heat recovery system thermally coupled to the electric power generator and the structure, the waste heat recovery system having a thermal management system disposed within the housing and a cooling system disposed proximate the housing; and a control system electrically coupled to the electric power generator, power conversion module, and waste heat recovery system, wherein the control system is designed and configured to determine, based upon an instantaneous thermal load and electrical load of the structure, operational characteristics of the electric power generator.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. A combined cooling, heating, and power (CCHP) system for delivering thermal energy and electrical energy to a structure in need thereof, the CCHP system comprising:
    an energy generator that simultaneously produces electrical energy and thermal energy as an output;
    a waste heat recovery system thermally coupled to the energy generator and including:
        a distribution system for delivering thermal energy to the structure; and
        a cooling system for providing conditioned air to the structure;
    wherein the waste heat recovery system is configured to:
        recover thermal energy from the energy generator;
        return a first portion of the recovered thermal energy to the energy generator; and
        deliver a second portion of the recovered energy to the distribution system or the cooling system depending on the present or future needs of the structure;
    a control system configured to control the energy generator and the waste heat recovery system; and
    a DC to DC boost converter (DDBC) electronically coupled to the energy generator and configured to condition the electrical energy for use by the structure, the DDBC including:
        a plurality of interleaved, isolated, full-bridge DC-DC converters arranged in a Delta-Wye configuration and a multi-leg bridge;
        an input current filter and a plurality of DC-AC converters, wherein the plurality of DC-AC converters are electronically coupled to the input current filter and configured to receive a discontinuous input current; and
        a plurality of transformers, wherein each of the plurality of transformers is electronically coupled to a corresponding respective one of the plurality of DC-AC converters.

2. The CCHP system according to claim 1, wherein the energy generator is a fuel cell.

3. The CCHP system according to claim 2, wherein the energy generator is a polymer electrolyte membrane fuel cell.

4. The CCHP system according to claim 2, wherein the control system is configured to control the fuel cell and the waste heat recovery system such that the structure utilizes about 100% of the electrical and thermal energy produced by the fuel cell.

5. The CCHP system according to claim 1, wherein the energy generator uses natural gas or propane as a fuel.

6. The CCHP system according to claim 1, wherein the system further includes an auxiliary burner, wherein the auxiliary burner is used to meet the thermal load of the structure when there is no electrical load needed by the structure.

7. The CCHP system according to claim 1, wherein the CCHP system is sized and configured as a drop-in replacement for an existing residential or light commercial heating, cooling, and hot water system.

8. A combined cooling, heating, and power (CCHP) system for use in a residential or light commercial structure having electric and thermal loads, the CCHP system comprising:
   a fuel cell system having thermal and electrical outputs;
   a waste heat recovery system including:
     a thermal management module;
     a storage system;
     a distribution system; an
     a cooling system;
   a control system in communication with the fuel system and the waste heat recovery system, the control system configured to:
     receive a signal representative of a required electrical load or a required thermal load;
     determine whether any additional loads are required by the structure after receiving the signal; and
     communicate with the fuel cell system and the waste heat recovery system so as maximize the utilization of the electrical and thermal outputs of the fuel cell system,
   wherein the communication with the fuel cell system and the waste recovery system only occurs when the thermal load and the electrical load are both needed by the structure, and
   wherein the control system limits the thermal and electrical outputs of the fuel cell system based upon the thermal load; and
   a DC to DC boost converter (DDBC) electronically coupled to the electrical output and configured to condition the electrical output for use by the structure, the DDBC including:
     a plurality of interleaved, isolated, full-bridge DC-DC converters arranged in a Delta-Wye configuration and a multi-leg bridge;
     an input current filter and a plurality of DC-AC converters, wherein the plurality of DC-AC converters are electronically coupled to the input current filter and configured to receive a discontinuous input current; and
     a plurality of transformers, wherein each of the plurality of transformers is electronically coupled to a corresponding respective one of the plurality of DC-AC converters.

9. A CCHP according to claim 8, wherein the waste heat recovery system is configured to recover thermal energy from the fuel cell system and to return a first portion of the recovered thermal energy to the fuel cell system and a second portion of the recovered energy to the distribution system, the storage system, or the cooling system.

10. A CCHP system according to claim 8, wherein the fuel cell system includes a polymer electrolyte membrane fuel cell.

11. A CCHP system according to claim 8, further including a control system configured to control the outputs of the fuel cell system and the waste heat recovery system so as to utilize about 100% of the electrical and thermal energy produced by the fuel cell system after receiving the signal.

12. A CCHP system according to claim 8, wherein the fuel cell system uses natural gas as a fuel.

13. A CCHP system according to claim 8, wherein the fuel cell system is electronically coupled to an external power grid and wherein the control system determines whether the fuel cell produces electric power for the external power grid.

14. A CCHP according to claim 8, wherein a first portion of the CCHP system resides within one of a plurality of enclosures, the first portion including the fuel cell system and the thermal management module.

15. A CCHP according to claim 14, wherein the distribution system is an existing distribution system within the structure.

16. A CCHP according to claim 14, wherein the storage and the cooling system are contained within another of the plurality of enclosures.

* * * * *